United States Patent
Lee et al.

(10) Patent No.: US 9,980,493 B2
(45) Date of Patent: May 29, 2018

(54) DUMPLING PRODUCING METHOD AND DEVICE

(75) Inventors: Edward Lee, Shanghai (CN); Muan Zhu, Jiangsu (CN); Derong Wang, Shanghai (CN); Gregory C. Vargas, St. Louis Park, MN (US); Michael P. Waldherr, Brooklyn Park, MN (US); Christopher J. Field, Greenwood, MN (US)

(73) Assignee: General Mills, Inc., Minneapolis, MN (US)

( * ) Notice: Subject to any disclaimer, the term of this patent is extended or adjusted under 35 U.S.C. 154(b) by 1422 days.

(21) Appl. No.: 13/391,080

(22) PCT Filed: Aug. 20, 2010

(86) PCT No.: PCT/US2010/046061
§ 371 (c)(1),
(2), (4) Date: May 21, 2012

(87) PCT Pub. No.: WO2011/022579
PCT Pub. Date: Feb. 24, 2011

(65) Prior Publication Data
US 2012/0219674 A1    Aug. 30, 2012

(30) Foreign Application Priority Data

Aug. 20, 2009    (CN) .......................... 2009 1 0168437

(51) Int. Cl.
*A21C 11/10*    (2006.01)
*A21C 9/06*    (2006.01)

(52) U.S. Cl.
CPC .............. *A21C 9/063* (2013.01); *A21C 9/061* (2013.01); *Y10T 83/6667* (2015.04); *Y10T 83/9411* (2015.04)

(58) Field of Classification Search
CPC ...................................................... A21C 9/063
USPC .................................. 99/450.2, 450.4, 450.6
See application file for complete search history.

(56) References Cited

U.S. PATENT DOCUMENTS

| | | | |
|---|---|---|---|
| 4,160,634 A | 7/1979 | Huang | |
| 4,441,408 A | 4/1984 | Costa | |
| 4,645,675 A | 2/1987 | Wilke | |
| 5,549,467 A | 8/1996 | Schultz | |
| 5,811,145 A * | 9/1998 | Morikawa | 426/503 |
| 7,293,974 B2 * | 11/2007 | Bortone et al. | 425/297 |

* cited by examiner

*Primary Examiner* — Lien T Tran
(74) *Attorney, Agent, or Firm* — Diederiks & Whitelaw, PLC; John L. Crimmins, Esq.

(57) ABSTRACT

The present invention provides a dumpling producing method and a dumpling producing device. The method comprises the following steps: cutting a mechanically sheeted dough sheet of a unidirectional texture into dumpling wrappers of a pre-defined shape, filling the stuffing into the dumpling sheet, and wrapping the dumpling wrapper along a fold line at an angle of 0 to 20 degrees to the texture orientation of each dumpling wrapper to produce the dumplings. The device comprises: a cutting mechanism consisting of a cutting unit and a rotating unit, wherein the rotating unit is configured to cause an angle formed between the texture orientation of the dumping wrapper and the fold line to be within 0 to 20 degrees.

9 Claims, 8 Drawing Sheets

DUMPLING PRODUCING METHOD AND DEVICE

CROSS-REFERENCE TO RELATED APPLICATIONS

The present application claims priority to International Application No. PCT/US2010/046061 filed 20 Aug. 2010, which in turn claims priority to Chinese Application No. 200910168437.5 filed 20 Aug. 2009, the teachings of all of which are incorporated herein by reference.

TECHNICAL FIELD

The present invention is related to a method of producing dumpling and a device producing dumplings according to the said method.

BACKGROUND TECHNOLOGY

In large scale manufacturing of dumplings, dough is mechanically sheeted in one direction into a dough sheet which will then be cut into dumpling wrappers of a pre-defined shape by cutters. As the dough sheet is sheeted and elongated unidirectionally, a texture of uniform orientations is formed in the dough sheet as well as in the cut-off dumpling wrappers. In the dumpling wrapper as shown in FIG. 1, bidirectional arrow lines A-A show the texture orientation of the dumpling wrapper formed by unidirectional sheeting, wherein the orientation of the texture is parallel to the sheeting direction. The broken line B-B shows a rotation axis (hereinafter referred to as "fold line") about which two parts of the dumpling wrapper are to be wrapped up and folded. Due to unidirectional shrink of the wrapper texture, length of a central line of the dumpling wrapper in parallel with the texture orientation thereof will reduce by approximately 14%, while width of a central line of dumpling sheet vertical to the texture orientation of the wrapper will increase by approximately 5%.

In the present automated dumpling manufacturing machine such as the T-16 dumpling machine of Tosei Inc, during the process of dumpling manufacturing, the dumpling fold line B-B is basically perpendicular to the texture orientation A-A of the dumpling wrapper. The filling pocket height (which refers to the height of highest position of the filling pocket of the dumpling from the underlying plane) of the dumpling made by such machine reduces while the width is increased, resulting in a loose alignment of the stuffing. Compared with the hand made dumpling, the cooked automated dumpling is less visually appealing and less juicy.

CONTENTS OF INVENTION

In order to overcome the said the above-mentioned problems, this invention provides a dumpling producing method comprising: cutting the dough sheet of a unidirectional texture sheeted by machine into dumpling wrappers of a pre-defined shape; filling the stuffing into the dumpling sheet; and wrapping the dumpling wrapper about the fold line at an angle of 0 to 20 degrees to the texture orientation of dumpling wrapper to produce the dumpling.

The present invention also provides a dumpling producing device comprising: a cutting mechanism consisting of a cutting unit and a rotating unit, wherein the rotating unit is configured to cause the texture orientation of the dumpling wrapper to be aligned at an angle of 0 to 20 degrees with the fold line.

Dumplings produced according to the aforesaid method and by above-mentioned device have an appealing visual shape and good taste with tight and juicy stuffing after being cooked.

BRIEF DESCRIPTION OF THE DRAWINGS

The present invention will be illustrated with reference to the following accompanying drawings.

DETAILED DESCRIPTION OF THE INVENTION

The dumpling producing method and device of the present invention will be described with reference to the accompanying drawings.

Figure 1:
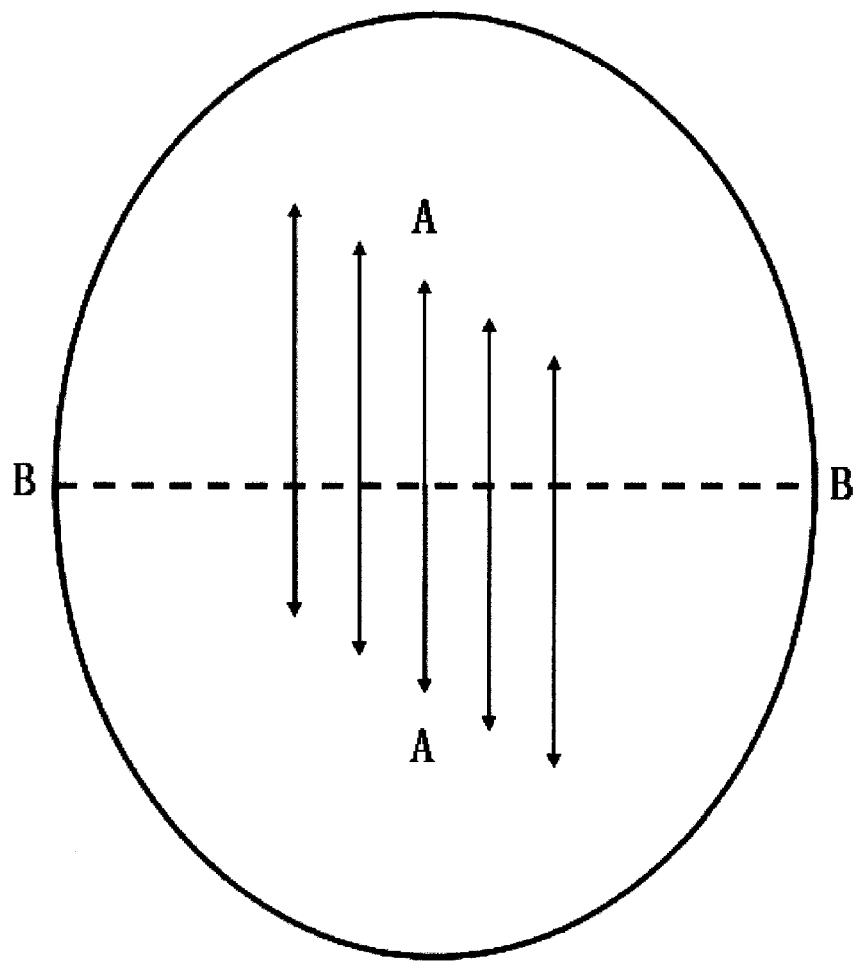
FIG. 1 is a view illustrating the fold line of a dumpling wrapper of traditional dumpling producing method.

FIG. 1 is a view illustrating the fold line of a dumpling wrapper according to the traditional dumpling producing method. The traditional dumpling producing method includes the following steps: cutting the dough sheet of unidirectional texture sheeted by machine into dumpling wrappers of a pre-defined shape; filling the stuffing into the dumpling sheet; and wrapping the dumpling wrapper about the fold line in about 90 degrees relative to the texture orientation of dumpling wrapper to produce the dumpling.

The difference of the dumpling producing method of the present invention from the traditional method is that during the process of dumpling production, the dumpling wrapper will be wrapped along the fold line in 0 to 20 degree (0 degree and 20 degrees included) relative to the texture orientation of dumpling wrapper to produce the dumpling.

Figure 2:
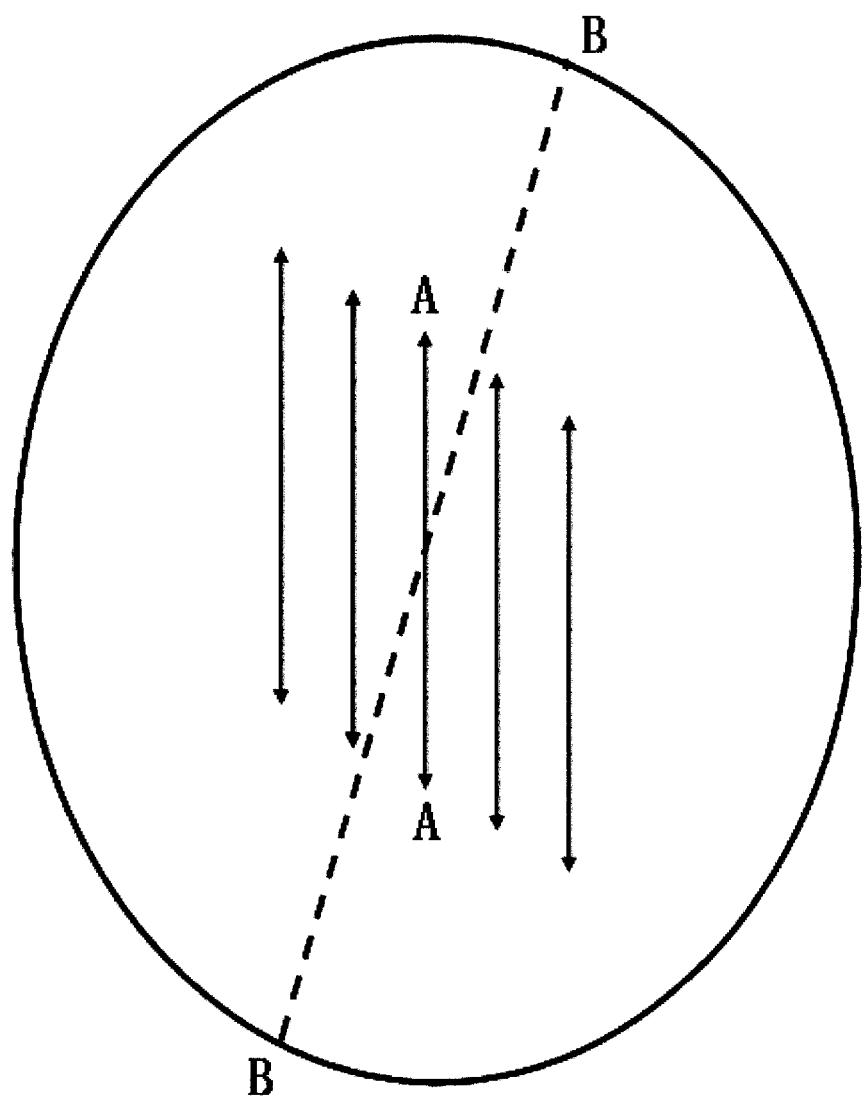
FIG. 2 is a view illustrating the fold line of a dumpling wrapper of the dumpling producing method according to a first embodiment of this invention.
Figure 3:
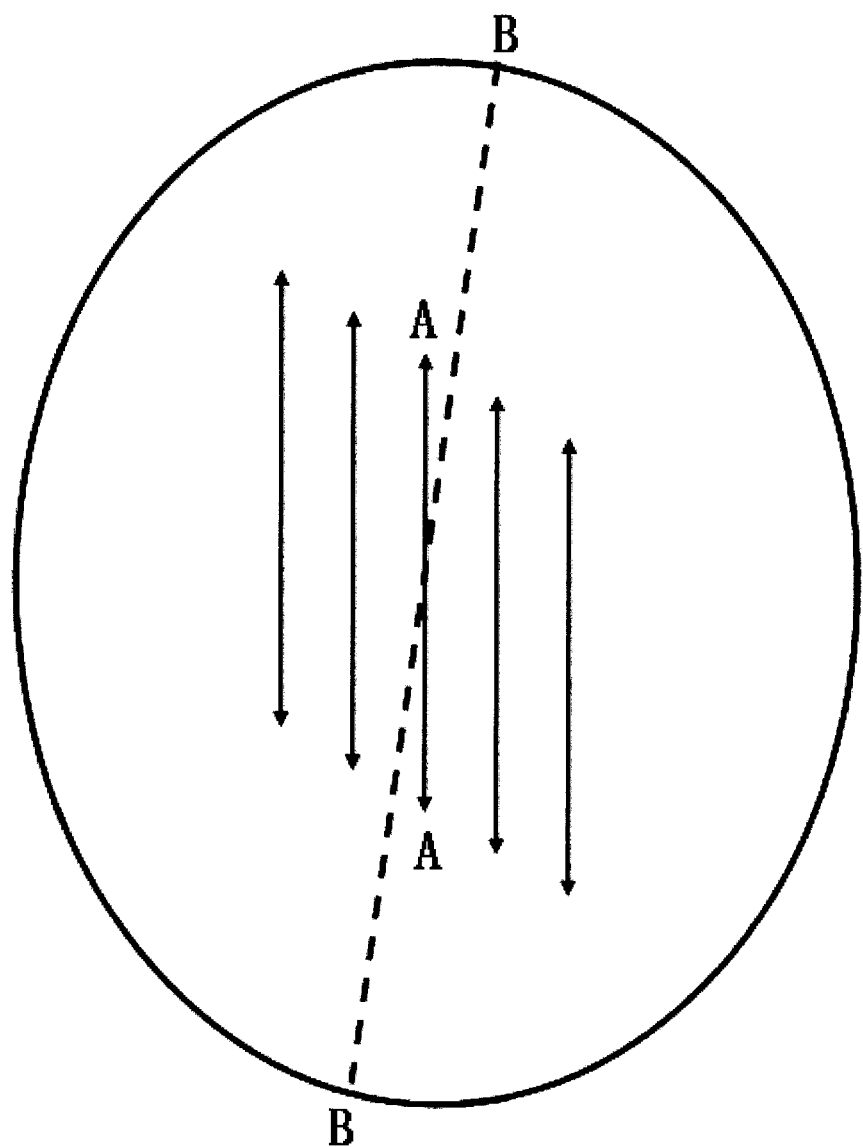
FIG. 3 is a view illustrating the fold line of dumpling wrapper of the dumpling producing method according to a second embodiment of this invention.
Figure 4:
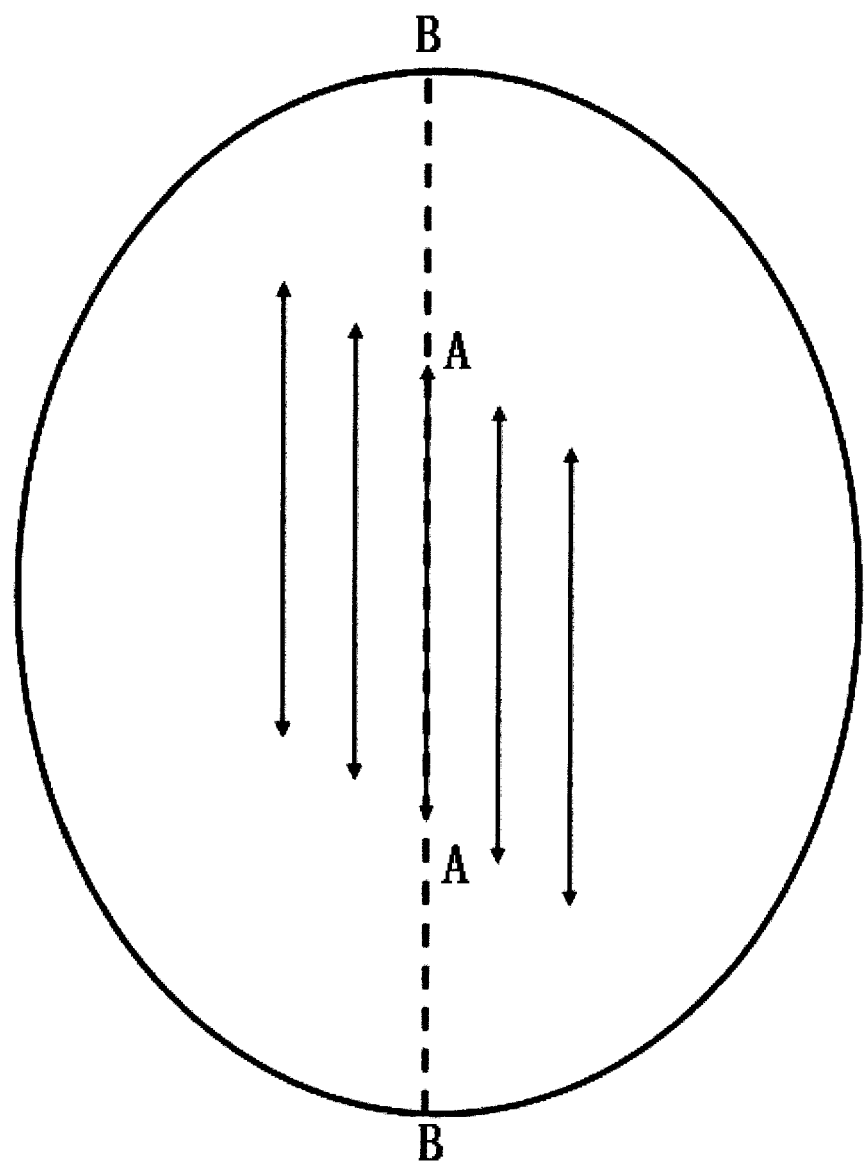
FIG. 4 is a view illustrating the fold line of dumpling wrapper of dumpling producing method according to a third embodiment of this invention.

More specifically, FIG. 2 is a view illustrating the fold line of a dumpling wrapper of the dumpling producing method according to the first embodiment of this invention. In the producing method of the first embodiment, the angle formed between the texture orientation of the dumpling wrapper and the fold line of the dumpling wrapper is 20 degree. FIG. 3 is a view illustrating the fold line of a dumpling wrapper of the dumpling producing method according to the second embodiment of this invention. In the producing method of second embodiment, the angle formed between the texture orientation of dumpling wrapper and the fold line of the dumpling wrapper is 10 degree. FIG. 4 is a view illustrating the fold line of a dumpling wrapper of the dumpling producing method according to the third embodiment of this invention. In the producing method of the third embodiment, the angle formed between the texture orientation of the dumpling wrapper and the fold line of the dumpling wrapper is 0 degree, namely in parallel. According to the producing methods of the first, second and third embodiments of this invention and the producing method of traditional method respectively, dumplings are made by using the dumpling wrapper of the same pre-defined shape and size and filling in same quantity of stuffing. Ten dumpling samples are selected respectively from the dumplings made according to the methods of three embodiments and traditional method for cooking. The filling pocket heights of those cooked dumplings are measured and the results are shown in the following chart:

| Sample | Traditional method | $1^{st}$ Embodiment | $2^{nd}$ Embodiment | $3^{rd}$ Embodiment |
|---|---|---|---|---|
| 1 | 26.1 | 28.5 | 29.3 | 29.9 |
| 2 | 26.2 | 28.2 | 28.8 | 31.8 |
| 3 | 26.1 | 27.9 | 30.2 | 31.0 |
| 4 | 24.6 | 29.3 | 29.5 | 34.2 |
| 5 | 26.2 | 28.6 | 29.1 | 28.7 |
| 6 | 26.3 | 27.5 | 28.8 | 29.8 |
| 7 | 23.9 | 29.1 | 29.4 | 29.9 |
| 8 | 26.3 | 28.8 | 30.3 | 31.2 |
| 9 | 26.2 | 29.1 | 29.6 | 29.9 |
| 10 | 24.5 | 28.4 | 29.5 | 30.6 |

Figure 5:
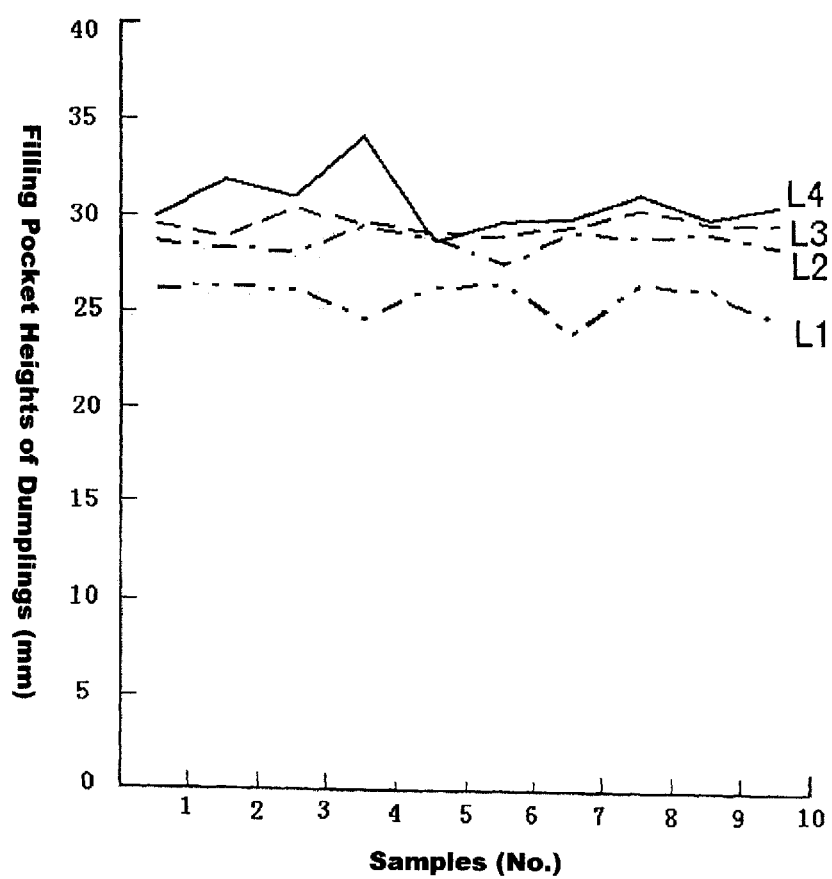
FIG. 5 is a chart showing the dumpling filling pocket heights of different examples.

Note:
The data shown above in the chart are the heights of filling pockets of cooked dumplings.
Unit: Millimeter FIG. 5 is a graph illustrating the dumpling filling pocket heights corresponding to the data of the above chart, in which the Y axis shows the heights of the dumpling filling pockets (unit: millimeter) and the X axis shows the number of samples. Dash dotted line L1 is the curve of the dumpling filling pocket heights of the 10 cooked dumplings produced according to the traditional method; Dash dotted line L2 is the curve of the dumpling filling pocket heights of the 10 cooked dumplings produced according to the method of first embodiment; the broken line L3 is the curve of the dumpling filling pocket heights of the 10 cooked dumplings produced according to the method of second embodiment; Line L4 is the curve of the dumpling filling pocket heights of the 10 cooked dumplings produced according to the method of third embodiment.

According to FIG. 5, it is obvious that an average height of the dumpling filling pockets of the cooked dumplings made according to the methods of $1^{st}$ through $3^{rd}$ embodiments is greater than an average height of the dumpling filling pockets of the cooked dumplings made according to the traditional method. It also can be seen from FIG. 5 that the smaller the angle between the texture orientation of dumpling wrapper and the fold line of the dumpling wrapper, the greater the average height of the dumpling filling pockets of the cooked dumplings. In the third embodiment, the angle between the texture orientation of dumpling wrapper and the fold line of the dumpling wrapper is the smallest, namely 0 degree. So the average height of the dumpling filling pockets of the cooked dumplings according to the method of third embodiment shown in FIG. 4 is the biggest.

As the average height of the dumpling filling pockets of the cooked dumplings according to the methods of $1^{st}$ through $3^{rd}$ embodiments is obviously greater than the average height of the dumpling filling pockets of the cooked dumplings according to the traditional method, the cooked dumplings made according to the methods of $1^{st}$ through $3^{rd}$ embodiments have appealing visual shape and good taste with tight pockets and juicy stuffing. In contrast, the cooked dumplings made according to the traditional method are less appealing and less juicy. The cooked dumplings made according to the methods of $1^{st}$ through $3^{rd}$ embodiments are more appealing in vision and taste.

Figure 6A:
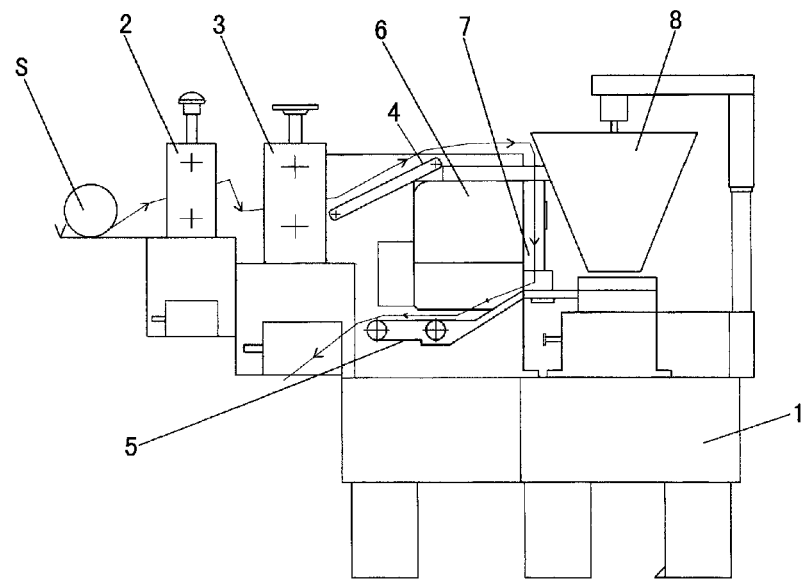
FIG. 6a is a front view of the dumpling producing device according to the first embodiment of this invention.
Figure 6B:
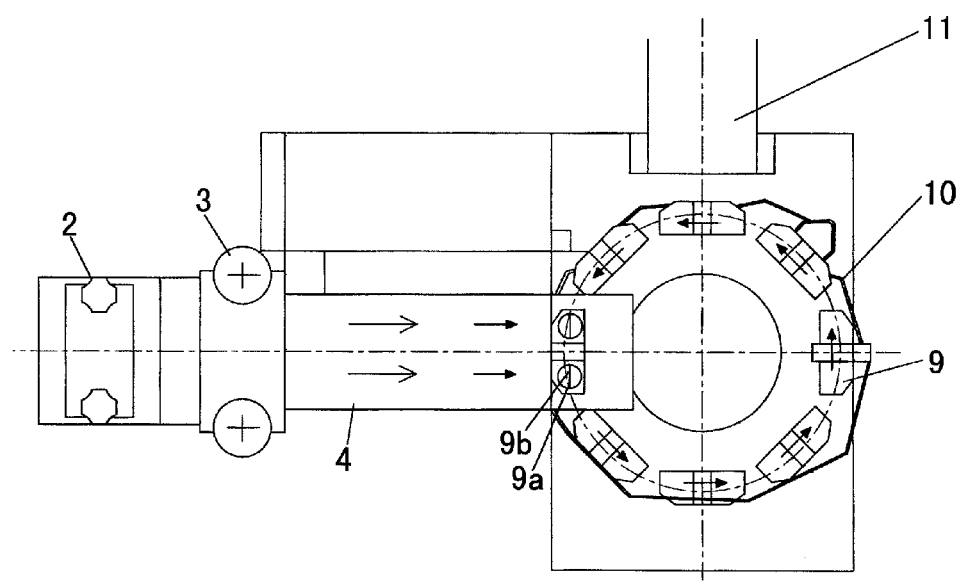
FIG. 6b is a top view of the dumpling producing device according to the first embodiment of this invention.

FIG. 6a is a front view of the dumpling producing device according to the first embodiment of this invention; FIG. 6b is a top view of the dumpling producing device according to the first embodiment of this invention. The dumpling producing device comprises the base 1, the first dough sheeting mechanism 2, the second dough sheeting mechanism 3, the input mechanism 4, the output mechanism 5, the cam housing 6, the cutting mechanism 7, the filling mechanism 8, the dumpling die 9, the die track 10, the transmitting belt 11 and other auxiliary mechanisms such as controlling mechanism. In the process of dumpling production, a dough sheet S made by another machine, is further sheeted by the first dough sheeting mechanism 2 and second dough sheeting mechanism 3 and becomes the dough sheet of pre-defined thickness with the unidirectional texture orientation. The dough sheet enter the cutting mechanism 7 along a transmitting route as shown by the arrow in FIG. 6a via input mechanism 4, in which the texture orientation of the dough sheet is aligned in the same direction as the dough sheet input direction of. The cutting mechanism 7, driven by the cam housing 6 powered by a motor (not shown), cuts the dough sheet into dumpling wrappers of pre-defined size in a prescribed rate. The residual dough sheet after the dumpling wrappers were cut by the cutting mechanism is outputted to a recycling mechanism (not shown) by the output mechanism 5.

The dumpling wrappers cut by the cutting mechanism 7 are placed into the dumpling die 9. As shown in the FIG. 6b, there are, for example, 8 sets of dumpling die 9 rotating in a rate corresponding to the cutting rate of cutting mechanism 7. Each set of dumpling die 9 has two dumpling clamps 9a, a folding axis 9b of which remains perpendicular to the input direction (shown by the arrow in FIG. 6b) of the dough sheet when the dumpling die 9 rotates to a position right below the cutting mechanism 7.

When the dumpling die 9 rotates to a position right below the cutting mechanism 7, it accepts the dumpling wrapper cut by the cutting mechanism 7; when the dumpling die 9 loaded with the dumpling wrapper rotates to a position right below the filling mechanism 8, the filing mechanism 8 fills in the dumpling stuffing; the dumpling die 9 loaded with the dumpling stuffing continues rotating to a position right opposite to the cutting mechanism 7, where the dumpling die 9 wraps the dumpling wrapper to form a dumpling; when the dumpling die 9 rotates into a position corresponding to the transmitting belt 11, the produced dumpling is delivered to a designated position by the transmitting belt 11.

Figure 7:
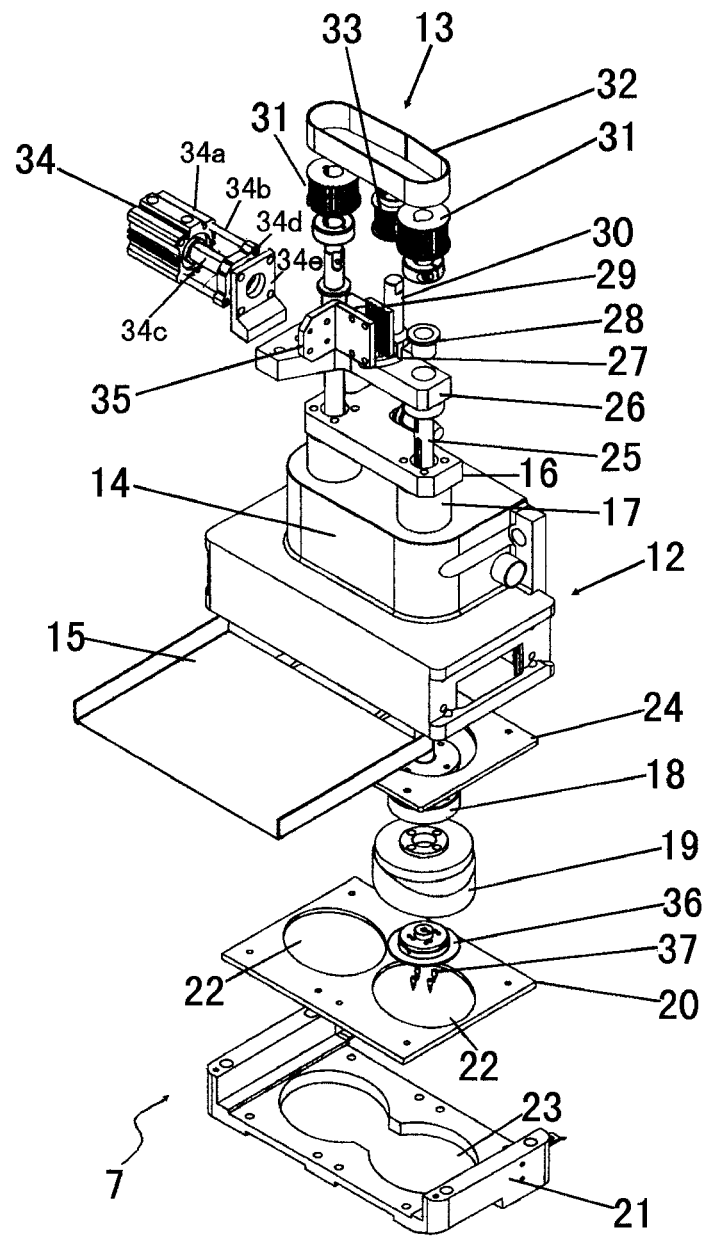
FIG. 7 is an exploded view showing the cutting mechanism 7 of the dumpling producing device according to the first embodiment of this invention.

FIG. 7 is an exploded view illustrating the cutting mechanism 7 of the dumpling producing device according to the first embodiment of this invention. The cutting mechanism 7 comprises a cutting unit 12 and a rotating unit 13. The rotating unit 13 is configured to cause the texture orientation of the dumping wrapper to be aligned at an angle of 0 to 20 degrees with the fold line.

A preferred structure is described as follows. The cutting unit 12 for cutting the input dough sheet into the dumpling wrappers of pre-defined shape, comprises the housing 14, the dough sheet inlet 15, the cutter shaft top plate 16, the cutter shaft 17, the cutter 19, the cutter die 20 and the cutter die mounting base 21. One end of the cutter shaft 17 is connected to the cutter shaft top plate 16, and the other end of the cutter shaft 17 is connected to the cutter 19. The cutter shaft top plate 16 connected to the cam housing 6 reciprocates up and down in a prescribed rate driven by the cam housing 6, to drive the cutter 19 to reciprocate via the cutter shaft 17. The cutter die 20 is mounted on the cutter die mounting base 21 and the cutter die mounting base 21 is mounted on the housing 14. The cutter die 20 has a hole 22 corresponding to the shape of cutting edge of the cutter 19, so as to cut the dough sheet passing the cutter die 20 into the dumpling wrapper of a pre-defined shape. The shape of the dumpling wrapper is defined by the shape of the cutting edge (bottom section) of the cutter 19. The cutter die mounting base 21 has a hole 23 corresponding to the hole 22 of the cutter die 20, so that the reciprocating cutter 19 could pass through the hole 22 and hole 23. The number of the cutter 19 within the cutting unit 12 may be one or more. In this embodiment, the number of the cutter 19 is two (only one is shown in the figure). That is to say, the cutter 19 in the cutting unit 12 cuts off two dumpling wrappers in a punch.

The cutting unit 12 may also comprise the cutter cleaning plate 24 for cleaning the cutter 19. The cutter cleaning plate 24 is mounted within the housing 14 and is located right above the cutter die 20. The cutter cleaning plate 24 has a hole with the diameter a little bigger than that of the cutting edge of the cutter 19, so that the dough residue stuck to the outer surface of the cutter 19 can be cleaned up when the cutter 19 passes through the cutter cleaning plate 24 after punching the dough sheet.

The rotating unit 13 is used to rotate the dumpling wrapper cut off by the cutting unit 12 through a prescribed angle. The rotating unit 13 includes the plunger shaft 25, plunger shaft top plate 26, tension bracket 27, shaft lining 28, grooved clamp plate 29, tension shaft 30, timing pulley 31, timing belt 32, tension pulley 33, drive device 34, timing belt bracket 35, sucker housing 18, sucker 36 and positioning part 37.

The axle center of the cutter shaft 17 and the cutter 19 of the cutting unit 12 has a coaxially penetrating hole with a diameter a little bigger than the diameter of the plunger shaft 25 of the rotating unit 13. There are also holes with diameter a little bigger than the diameter of the plunger shaft 25 of the rotating unit 13 formed on the cutter shaft top plate 16 at a position corresponding to the holes of cutter shaft 17. A hole with diameter a little bigger than the diameter of the plunger shaft 25 of the rotating unit 13 is also formed on the plunger shaft top plate 26 of the plunger shaft 25 of the rotating unit 13. One end of the plunger shaft 25 of the rotating unit 13 passes through the center hole of the cutter 19, the cutter shaft 17, the cutter shaft top plate 16 and the plunger shaft top plate 26 from the bottom up in turn, and is rotatably fixed on and protrude out of the plunger shaft top plate 26 through the shaft lining 28. One part of the plunger shaft 25 protruding out of the plunger shaft top plate 26 is fixedly connected to the timing pulley 31 and rotatably driven by the timing pulley 31. The other end of the plunger shaft 25 is connected to the sucker housing 18, which can hold without limit to a vacuum sucker embedded into the cutter 19 under non-operation status. The positioning part 37 such as position pins is mounted on the bottom surface of the sucker 36 to position the dumpling wrappers stuck on the sucker 36, so that the dumpling wrapper does not turn around relative to the sucker when the sucker rotates. The plunger shaft top plate 26 is connected to and driven by the cam housing 6 to reciprocate up and down in a prescribed rate to drive the plunger shaft 26 upward and downward.

In this embodiment, the cutting unit 12 comprises two cutters. The timing pulley 31 on the two plunger shafts 25 is driven by the endless timing belt 32. The timing belt 32 is stretched by the tension pulley 33 which is mounted on one end of the tension shaft 30. The other end of the tension shaft 30 is mounted on the tension bracket 27 which is mounted on the plunger shaft top plate 26. The two clamp plates of the grooved clamp plate 29 are fixedly clamped on one side of the timing belt 32 between the timing pulleys 31. The clamp plate at one side of the grooved clamp plate 29 is fixedly connected to the plate-shaped timing belt bracket 35, forming an L-shaped angle. The timing belt bracket 35 is mounted on the drive surface 34d of the drive device 34, which will be described in the following paragraph.

The drive device 34 includes the body 34a, the alignment bar 34b which prevents the belt bracket 35 from rotating the positioning bar 34c which can be extended out and drawn back along with the alignment bar 34b, the driving plate 34d mounted on the ends of the alignment bar 34b and positioning bar 34c and which can move back and forth in straight line along with the alignment bar 34b, and the mounting base 34e arranged between the body 34a and driving plate 34d across the alignment bar 34b and the positioning bar 34c. The body 34a is fixed on a side of the mounting base 34e, the bottom of which is fixed on the plunger shaft top plate 26. The driving plate 34d moves back and forth in straight line driven by the positioning bar c and drives the timing belt 32 to move in straight line for a certain distance, so that the timing belt 32 rotates the timing pulley 31 and plunger shaft 25 to rotate the sucker 36 through a prescribed angle.

The following is a description about the mechanism of operation of the cutting mechanism 7. After the dough sheet is fed into the cutting mechanism 7 through the dough sheet inlet 15, the cam housing 6 firstly drives the cutter top plate 16 to move downward so as to drive the cutter 19 to move downwards to cut the dough sheet. After the cutter 19 punches through the cutter die to cut off the dumpling wrapper of pre-defined shape, the cam house 6 stops driving the top plate of cutter top plate 16 and drives the plunger shaft top plate 26 to move downwards. At the same time, the drive device 34 begins driving the timing belt 32 to move in straight line so as to drive the timing pulley 31 to rotate. The cutter 19 remains still and the sucker 36 catching up the dumpling wrapper begins rotating while moving downwards. When the sucker 36 moves downward to a position close to the dumpling clamp 9a of the dumpling die 9 and the sucker rotates to a predescribed angle such as 90 degrees, the sucker 36 releases the dumpling wrapper, which falls into the dumpling clamp 9a.

Afterwards, the sucker 36 moves up and rotates back to its original position into the cutter 19, which moves up and returns to its initial position to complete one time cutting operation. Multiple conventional turning drive methods are available besides those mentioned in this filing. For example, utilization of a electric motor with precise motion control such as a servo will not require the sucker 36 to rotate back to its original position.

The distance of the movement in straight line of the timing belt 32 driven by the drive device 34 can be adjusted, so that the timing pulley 31 rotates through 0 to 90 degrees and makes the dumpling wrapper rotates 0 to 90 degrees.

As the texture orientation of the dumpling wrapper is in the same direction as the input direction of the dough sheet, if the drive device is adjusted to make the timing pulley rotating through 0 degree, namely the dumpling wrapper does not rotate, the fold line of the dumpling wrapper falling into the dumpling clamp 9a forms a 90 degree angle with the texture orientation of dumpling wrapper. In another words, this kind of dumpling producing method is the same as the traditional method of dumpling production.

If the drive device is adjusted to make the timing pulley rotates through 70 degrees, namely the dumpling wrapper rotates 70 degree, the included angle formed between the fold line of the dumpling wrapper falling into the dumpling clamp 9a and the texture orientation of the dumpling wrapper is 20 degrees. In other words, this kind of dumpling producing method is the same as the dumpling producing method of first embodiment of this invention.

If the drive device is adjusted to make the timing pulley rotates 80 degree, namely the dumpling wrapper rotates through 80 degrees, the angle formed between the fold line of the dumpling wrapper falling into the dumpling clamp 9a and the texture orientation of the dumpling wrapper is 10 degrees. In other words, this kind of dumpling producing method is the same as the dumpling producing method of second embodiment of this invention.

If the drive device is adjusted to make the timing pulley rotates 90 degree, namely the dumpling wrapper rotates 90 degree, the angle formed between the fold line of the dumpling wrapper falling into the dumpling clamp 9a and the texture orientation of the dumpling wrapper is 0 degree. In other words, this kind of dumpling producing method is same as the dumpling producing method of third embodiment of this invention shown in FIG. 2.

Figure 8:
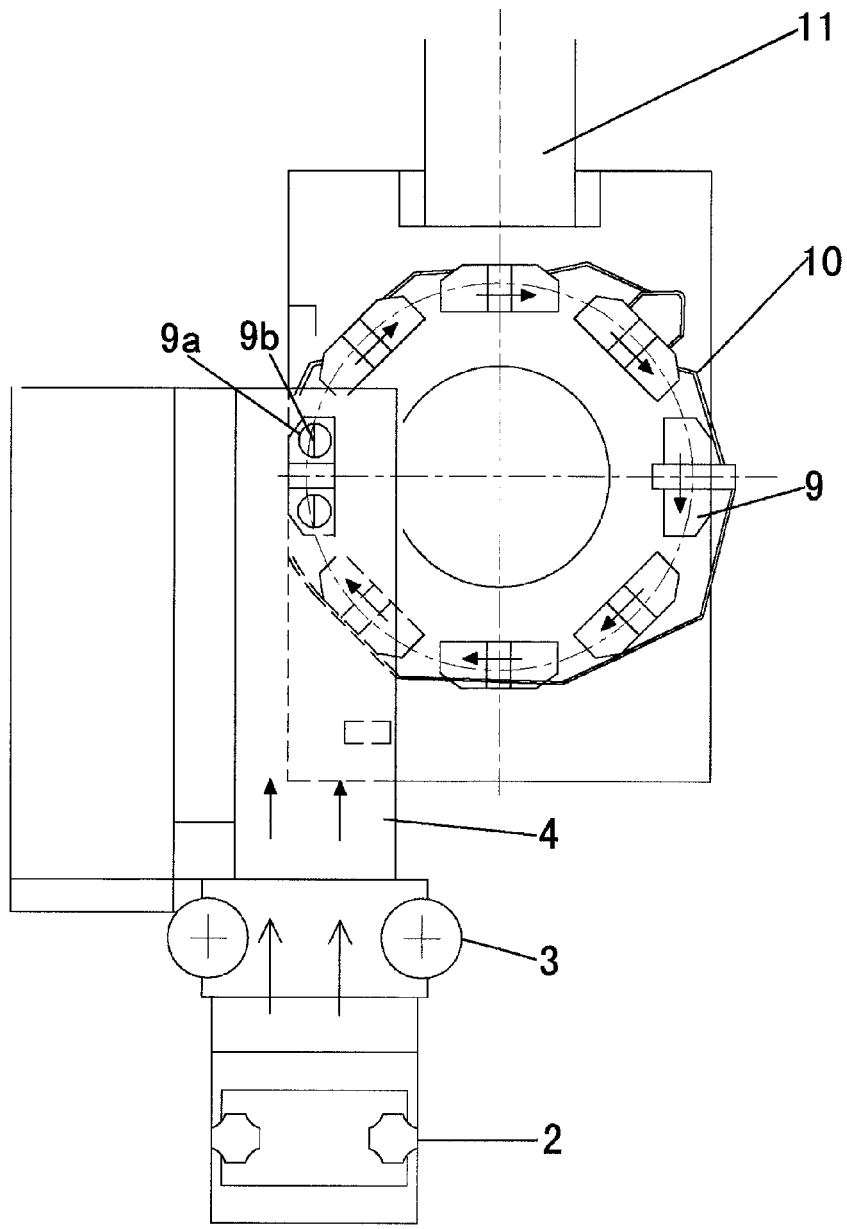
FIG. 8 is a top view of the dumpling producing device according to the second embodiment of this invention.

With the dumpling machine as described in the first embodiment, the dumpling producing method of the present invention can be applied to turn out dumplings of appealing appearance and pleasing tastes. FIG. 8 is a top view illustrating the dumpling producing device according to the second embodiment of this invention. This dumpling producing device includes input mechanism, cutting mechanism and dumpling die. When the dumpling die 9 rotatably travels to a position right below the cutting mechanism, the angle between the folding axis 9b of the dumpling clamp 9a of dumpling die 9 and the input direction of the dough sheet of the input mechanism is 0 degrees.

More specifically, the dumpling producing device in this embodiment is formed by the first dough sheeting mechanism 2, the second dough sheeting mechanism 3, the input mechanism 4, the output mechanism 5, the dough sheet inlet 15 and other auxiliary mechanisms shown in FIG. 6a which have rotated through 70 to 110 degrees relative to the cutting mechanism 7, so that the angle between the folding axis 9b of the dumpling clamp 9a and the input direction (shown by the arrow in FIG. 8) of the dough sheet is 0 to 20 degree when the dumpling die 9 rotates to a position right below the cutting mechanism 7. In this embodiment, it is unnecessary to provide the rotating unit 13 shown in FIG. 7 in the cutting mechanism 7. In this embodiment, after the dough sheet is input into the cutting mechanism 7 from the dough sheet inlet 15, the cam housing 6 firstly drives the cutter top plate 16 to move downwards, so as to drive the cutter 19 to move downwards to cut the dough sheet, which falls into the dumpling clamp 9a right below the cutter 19. When the above-mentioned rotation is 70 or 110 degrees, the angle formed between the folding axis 9b of the dumpling clamp 9a and the input direction of the dough sheet is 20 degrees when the dumpling die 9 rotates to a position right below the cutting mechanism 7. When the above-mentioned rotation is 80 or 100 degrees, the angle formed between the folding axis 9b of the dumpling clamp 9a and the input direction of the dough sheet is 10 degrees when the dumpling die 9 rotates to a position right below the cutting mechanism 7. When the above-mentioned rotation is 90 degrees, the angle formed between the folding axis 9b of the dumpling clamp 9a and the input direction of the dough sheet is 0 degree when the dumpling die 9 rotates to a position right below the cutting mechanism 7.

The angle formed between the folding axis 9b of the dumpling clamp 9a and the feeding direction of the dough sheet (as shown by the arrow in FIG. 8) is 0 degrees when the dumpling die 9 rotates to the position right below the cutting mechanism 7. According to the dumpling producing methods of the embodiments 1 to 3 of this invention and by utilizing the dumpling producing device of this embodiment, high quality dumpling with appealing shape and better taste can be produced efficiently.

The above-mentioned embodiments are used to clearly describe the technical concept of this invention, but the invention is not limited to these embodiments. A person skilled in the art may easily come up with various changes and modifications according to the technical motivation of this invention. For example, in order to realize the dumpling producing method of this invention, in the first embodiment according to the dumpling producing device of this invention, the rotating unit 13 is not disposed in the cutting mechanism 7, but at the bottom of each dumpling clamp 9a, so that the dumpling clamp 9a rotates through a described angle (such as 70 degree, 80 degree or 90 degree) itself when it travels to the position right below the cutter. In that case, the angle formed between the fold line of the dumpling wrapper and the texture orientation of dumpling wrapper could be 0 to 20 degrees, satisfying the requirement for producing dumplings with the expected effect of this invention.

Therefore various changes and modifications are all included in the scope of the appended claims without departing from the concept and spirit of this invention.

The invention claimed is:

1. A dumpling producing device comprising:
a cutting mechanism that includes a cutting unit and a rotating unit,
wherein the rotating unit is configured to rotate a dumpling wrapper cut by the cutting unit relative to a dumpling die.

2. A dumpling producing device according to claim 1, characterized in that the rotating unit is configured to rotate the dumpling wrapper cut by the cutting unit so that an angle formed between a texture orientation of the dumpling wrapper and a fold line of the dumpling die is 0 to 20 degrees.

3. A dumpling producing device according to claim 2, characterized in that the rotating unit is configured to rotate the dumpling wrapper so that the angle formed between the texture orientation of the dumpling wrapper and the fold line is 0 degrees.

4. A dumpling producing device according claim 2, characterized in that the rotating unit includes a sucker and a positioning part, the sucker being configured to suction attach the dumpling wrapper.

5. A dumpling producing device according to claim 2, wherein the texture orientation of the dumpling wrapper is formed by unidirectional sheeting and is parallel to a sheeting direction.

6. A dumpling producing device comprising:
an input mechanism configured to input a dough sheet having a unidirectional texture;
a cutting mechanism configured to receive the dough sheet from the input mechanism and cut a plurality of dumpling wrappers of a predefined shape off of the dough sheet, each of the plurality of dumpling wrappers having the unidirectional texture of the dough sheet; and a dumpling die that defines a folding axis, characterized in that the cutting mechanism is configured to rotate each of the plurality of dumpling wrappers relative to the dumpling die.

7. A dumpling producing device according claim 6, characterized in that the cutting mechanism is configured to rotate each of the plurality of dumpling wrappers relative to the dumpling die so that an angle formed between the folding axis of the dumpling die and an orientation of the unidirectional texture of the dumpling wrapper is 0 to 20 degrees.

8. A dumpling producing device according to claim 7, wherein the texture orientation of the dough sheet is formed by unidirectional sheeting and is parallel to a sheeting direction.

9. A dumpling producing device according claim 8, characterized in that the cutting mechanism is configured to rotate each of the plurality of dumpling wrappers relative to the dumpling die so that the angle formed between the folding axis of the dumpling die and the orientation of the unidirectional texture of the dumpling wrapper is 0 degrees.

* * * * *